United States Patent [19]

Best

[11] 4,130,846
[45] Dec. 19, 1978

[54] MAGNETIC TRANSDUCER

[75] Inventor: Donald T. Best, Lafayette Hill, Pa.

[73] Assignee: Sperry Rand Corporation, New York, N.Y.

[21] Appl. No.: 791,344

[22] Filed: Apr. 27, 1977

[51] Int. Cl.² ............................................. G11B 5/28
[52] U.S. Cl. ..................................... 360/120; 360/113
[58] Field of Search ............... 360/120, 119, 122, 113, 360/125, 126, 127, 115; 340/174 EB

[56] References Cited

U.S. PATENT DOCUMENTS

| | | | |
|---|---|---|---|
| 3,194,894 | 7/1965 | Smith | 360/119 |
| 3,827,083 | 7/1974 | Hosaka et al. | 360/125 |
| 3,840,898 | 10/1974 | Bajorek et al. | 360/113 |

OTHER PUBLICATIONS

IBM Technical Disclosure Bulletin, vol. 15, No. 8, Jan. 1973, pp. 2626–2627.

Primary Examiner—John H. Wolff
Attorney, Agent, or Firm—Walter B. Udell; Eugene T. Battjer; Thomas J. Scott

[57] ABSTRACT

A magnetic read/record head having a layer of uniaxially anisotropic magnetic material as the pole faces, which increases the ratio of magnetic reluctance between the pole faces to the magnetic reluctance along the fringing flux path through the recording medium. Two embodiments of the invention are disclosed, one embodiment providing a layer of anisotropic magnetic material in a continuous layer around a complete loop from one pole face to the other pole face, and the other embodiment providing a layer of anisotropic magnetic material confined to each of the pole regions.

7 Claims, 7 Drawing Figures

MAGNETIC TRANSDUCER

This invention relates to magnetic recording heads, and more particularly relates to magnetic recording heads having a layer of uniaxially anisotropic material applied to the gap faces of the magnetic head poles to improve performance and increase head life. In prior art magnetic heads the magnetic orientation of the field pattern depends largely on the strength of the magnetic material employed and the size of the head at the gap. This invention overcomes the prior art problem in that the field pattern at the gap of the head is altered in such a way that the magnetic recording properties are improved. This not only favors the write properties of the head, permitting shorter recording times but also allows the head to produce a narrower pulse on read-back.

Briefly, the invention contemplates achieving a magnetic orientation in the head magnetic material so that the easy direction of magnetization is normal to the gap length. The field pattern of the head is then altered in such a way that the magnetic recording properties are improved. The component of the field perpendicular to the gap is relatively higher and narrower. This not only favors the write properties of the head, permitting a narrower transition to be written, but also allows the head to produce a narrower pulse on readback because it has long been known that the pulse output is proportional to the convolution of the head field pattern and the magnetization charge on the magnetic medium, that is, since the field pattern is narrower, the pulse will be narrower.

This result is achieved by adding layers of uniaxially anisotropic material on the pole faces of the magnetic head which face the head gap. Typical structures are illustrated in the drawings. The uniaxially anisotropic material may be bonded or connected in any manner which does not destroy the magnetic characteristics of the layer. Additionally, the anisotropy of the head material also provides an effectively higher reluctance gap, driving more of the flux around the core on readback, leading to a higher amplitude pulse.

A primary object of the invention is to provide a novel magnetic read/record head which records shorter or narrower pulses on the magnetic recording medium, provides a higher amplitude readback pulse from the recording medium, and increases permissible head height to thereby provide longer head life.

Another object of the invention is to provide a novel magnetic read/record head as aforesaid by increasing the ratio of magnetic head gap reluctance between the pole faces to the gap reluctance along the fringing flux path through the recording medium.

A further object of the invention is to provide a novel magnetic read/record head as aforesaid by adding layers of uniaxially anisotropic material on the magnetic head pole faces which face the head gap.

Yet another object of the invention is to provide a novel magnetic read/record head as aforesaid in which anisotropic material is used for either the entire head or for a portion of the head extending from one or both pole faces which face the head gap.

The foregoing and other objects of the invention will become clear from the following description in conjunction with an examination of the appended drawings, wherein.

In the several figures, like elements are denoted by like reference characters.

Figure 2:
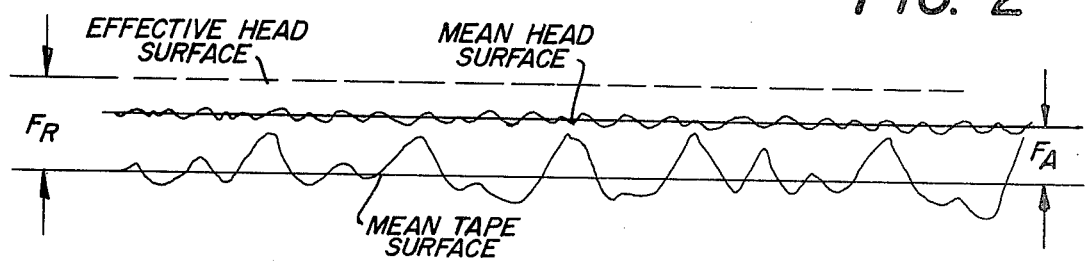
FIG. 2 is a diagram of flying height for the illustrative head of FIG. 1, and is an enlarged view in the phantom elipse designated as 2 in FIG. 1.
Figure 1:
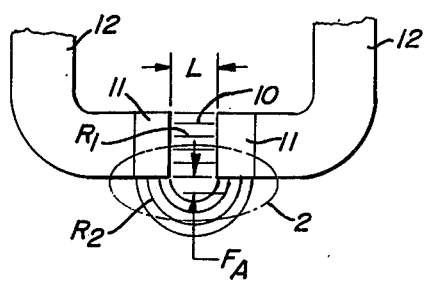
FIG. 1 illustrates a magnetic head in the poles and gap region.
Figure 3:
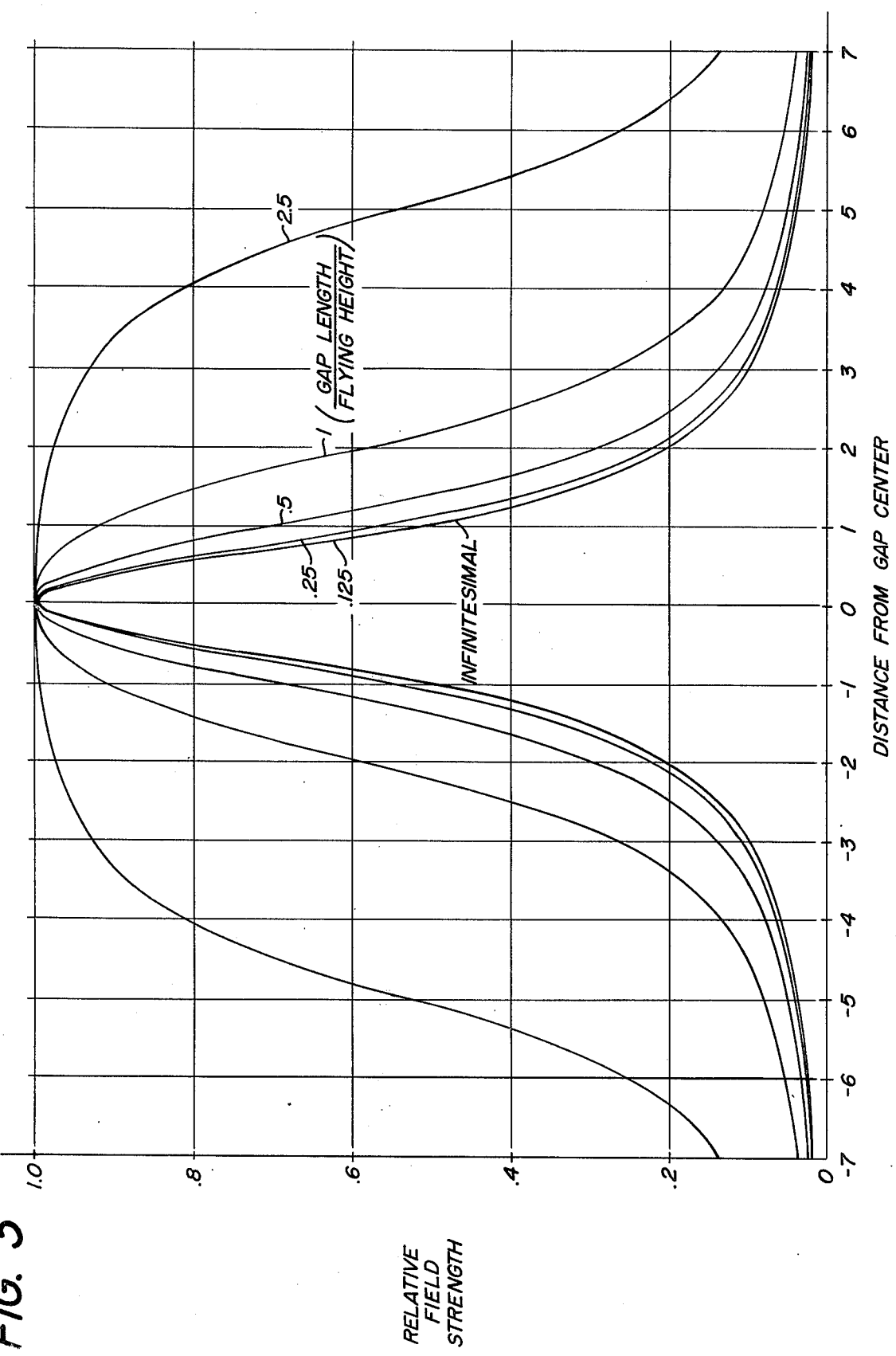
FIG. 3 is a diagram showing the Karlgvist field strength component of magnetization in the direction of the head gap length as a function of the distance from the gap center for different ratios of gap length to flying height.

Before describing the embodiments of the invention shown in FIGS. 4 through 7, it will be helpful to first consider FIGS. 1 to 3 and the term "flying height" which is one factor in the field strength diagram of FIG. 3. By flying height is meant the average spacing between the location of the mean head surface and the mean magnetic tape surface which moves across the head.

In FIG. 1 this is shown in the phantom elipse as the distance $F_A$ which designates "apparent flying height". This is shown on a larger scale in FIG. 2, where it is observed that it is the distance between the mean head surface and the mean magnetic recording tape surface, the actual surfaces being represented by the peak-and-valley lines. Also shown in FIG. 2 is the distance $F_R$ which designates "real flying height", this distance being larger than $F_A$ and being the distance between the mean tape surface and the effective head surface. The effective head surface is caused to recede from the mean physical head surface by reduction in permeability at the physical head surface caused by impact and abrasion of the head surface by the surface of the magnetic tape and other particles such as dust or dirt.

For a given flying height, minimum gap length produces the sharpest or narrowest pulse on the recording medium, and this is clearly seen from the showing of FIG. 3. However, too short a gap causes readback problems by making gap reluctance too low compared to the reluctance of the pick-up coil magnetic path and can make writing difficult because flux crosses the gap between pole faces rather than fringing out through the recording medium. Therefore a trade-off is necessary.

Accordingly, the object of the invention is to increase the ratio of gap reluctance between the pole faces to the gap reluctance along the fringing path through the recording medium. This is illustrated in FIG. 1 by the ratio $R_1/R_2$ = as large as possible, where $R_1$ is the reluctance of the gap 10 between the pole pieces 11 which terminate the yoke arms 12, and $R_2$ is the reluctance along the fringing recording path. The maximizing of the ratio $R_1/R_2$ is always desirable and has been a continuing problem in the development of magnetic recording heads.

One attempted solution has been to introduce conductive materials into the gap to induce eddy currents which set up opposing fields and effect a flux squirting action causing a larger portion of the flux to pass outward through the recording medium instead of directly between the pole faces. This approach is only successful for high density transient recording and is detrimental in low transient recording situations. More importantly, heads today have gap lengths on the order of microinches, and it is not possible to use gap inserts because they are not handleable, and at such thin dimensional sections tend to display anomolous characteristics rendering heads very non-uniform, both singly and from head to head.

The invention overcomes the problem by using anisotropic material for either the entire head or for a portion of the head extending from one or both poles, preferably both poles. An anisotropic magnetic material exhibits significantly different permeability properties in different directions of magnetization, one direction being a relatively easy direction of magnetization ($\mu_e$) and the orthogonal direction being a relatively harder direction of magnetization ($\mu_h$). A typical material which can be used is the nickel-iron formulation known as 4-79 Permalloy which exhibits a ratio of $\mu_e/\mu_h$ of one thousand or higher.

Figure 4:
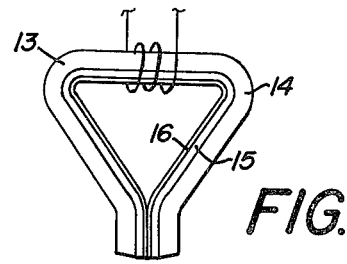
FIG. 4 illustrates one form of the novel magnetic head according to the invention.
Figure 5:
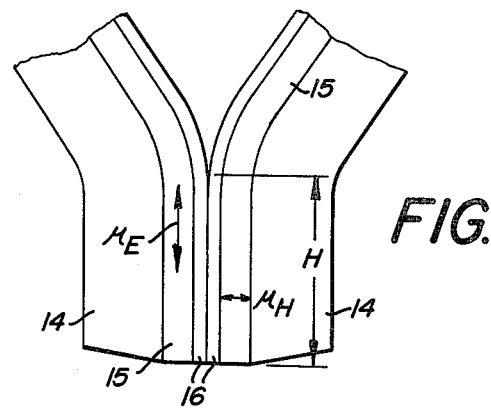
FIG. 5 is an enlarged fragmentary view of the poles and gap region of the head of FIG. 4.

Referring now to FIGS. 4 and 5 of the drawings, there is seen a magnetic head 13 comprising a piece of hard magnetic backing material 14 which may be plated while flat with an anisotropic layer 15 and a separation layer 16. The plated flat unit may then be bent or doubled around a form or mandrel and closed upon itself so that the gap length is twice the thickness of the separation layer 16. The separation bonding layer could typically be any suitable epoxy resin material, such as Devcon 5 minute epoxy made by Devcon Corp. of Danvers, Mass., or Eastman 910 adhesive made by Eastman Kodak of Rochester, New York. The anisotropic layer may be applied by any of the well known plating techiques used to make thin film magnetic memories.

Figure 6:
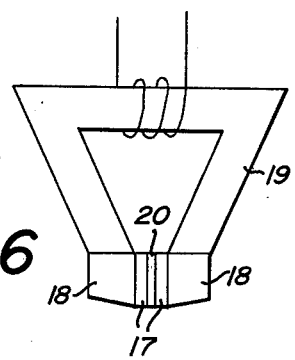
FIG. 6 is another embodiment of the novel magnetic head according to the invention.
Figure 7:
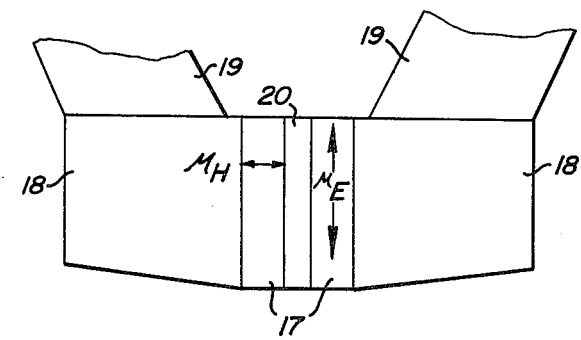
FIG. 7 is an enlarged fragmentary view of the poles and gap region of the head of FIG. 6.

FIGS. 6 and 7 illustrate another form of head where the anisotropic layer is not continuous about the entire head but is instead a layer 17 on pole pieces 18 carried by a yoke 19, with a separation layer 20 between the anisotropic layer 17.

As seen in both embodiments the anisotropic layer is formed so that the high reluctance direction of magnetization is through the separation layer of the head gap, whereas the low reluctance direction of magnetization is along the fringing flux path and through the magnetic medium to be recorded upon. The flux is thereby forced outward along the fringing path rather than across the gap, thus markedly increasing the $R_1/R_2$ ratio and permitting the height H of the head at the gap to be substantially increased without degrading head performance. In a normal head such an increase in head height H would decrease $R_1$ substantially and degrade the $R_1/R_2$ ratio. The increased head height H is desirable since it increases head life by allowing for greater abrasion wear of the head before replacement is necessary.

Having now described the invention in connection with particularly illustrated embodiments thereof, it will be appreciated that modifications and variations of the invention may now occur from time to time to those persons normally skilled in the art without departing from the essential scope or spirit of the invention, and accordingly it is intended to claim the invention broadly as well as specifically, as set forth in the appended claims.

What is claimed to be new and useful is:

1. A magnetic read/record transducer structure having a pair of poles with apposed pole faces spaced from one another by a separation layer which defines a single gap between said pole faces, each of said pole faces comprising a layer of uniaxially anistropic magnetic material characterized by low magnetic permeability in a first direction between the pole faces through the separation layer and characterized by substantially higher magnetic permeability in a direction orthogonal to said first direction, whereby the ratio of magnetic head gap reluctance between the pole faces to the gap reluctance along the fringing flux path through the recording medium is increased to thereby provide sharper more narrowly defined recorded pulses and higher amplitude readback pulses.

2. A magnetic transducer structure as defined in claim 1 wherein both of said pair of pole faces each comprise a layer of uniaxially anisotropic magnetic material characterized as set forth in claim 1.

3. A magnetic transducer structure as defined in claim 1 wherein said structure comprises a complete magnetic loop and said anisotropic magnetic material is confined substantially to the region of said poles.

4. A magnetic transducer structure as defined in claim 1 wherein said structure comprises a complete magnetic loop and said anisotropic magnetic material extends in a continuous layer around said loop from one pole face to the other pole face.

5. A magnetic transducer structure as defined in claim 1 wherein said uniaxially anisotropic magnetic material is a nickel-iron material.

6. A magnetic transducer structure as defined in claim 1 wherein said separation layer is made of isotropic non-magnetic material.

7. A magnetic transducer structure as defined in claim 1 wherein said separation layer is an epoxy resin.

* * * * *